United States Patent Office 2,788,372
Patented Apr. 9, 1957

2,788,372

HUMECTANT PRODUCT OF CONDENSATION OF SORBITOL WITH A 1,2-ALKYLENE OXIDE

John D. Brandner, Arden, Del., assignor to Atlas Powder Company, Wilmington, Del., a corporation of Delaware No Drawing. Application April 17, 1953,
Serial No. 349,568

3 Claims. (Cl. 260—615)

This invention relates to humectants and particularly to polyhydroxylic compounds and compositions having valuable humectant properties.

It is an object of the invention to provide novel humectant compositions.

It is a further object to provide hydroxyalkyl ethers of sorbitol which are particularly valuable as moisture conditioners in a wide field of industrial applications.

A more specific object is to provide, as new compounds, sorbitol monoethers of 1,2 alkylene glycols containing no more than 3 carbon atoms.

The above and other objects will become more apparent in the course of the following description and the appended claims.

Sorbitol has many of the properties required for an ideal humectant and moisture conditioning agent. It is stable, completely non-volatile, and stabilizes the moisture content of materials treated therewith in a satisfactory manner. It is, however, subject to one disadvantage that renders it unsuitable as a humectant in a number of applications. Sorbitol is a crystalline solid at room temperature and, under conditons of low humidity, may crystallize from compositions in which it serves as a humectant.

Numerous attempts have been made to prepare sorbitol containing or sorbitol-related compositions, which will be free of this objectionable tendency to crystallize, with varying degrees of success. For example, U. S. Patent 2,172,357 discloses a composition, obtainable by electrolytic reduction of sugars under selected conditions, containing sorbitol together with substantial quantities of by-products of the reduction which by-products inhibit crystallization of the sorbitol. The said by-products comprised desoxy hexitols and pentitols, anhydro hexitols, and organic acids or their salts.

More recently processes have been developed by which sorbitol of high purity can be produced economically in large volume by catalytic hydrogenation under pressure. In accordance with the present invention high purity sorbitol, which may be made by catalytic hydrogenation of glucose or otherwise, is converted to products which retain the hygroscopic nature and humectant qualities of sorbitol but which are non-crystallizing at ordinary temperatures.

The novel humectants of the present invention are mono sorbitol ethers of 1,2-alkylene glycols containing no more than 3 carbon atoms. They may be prepared by the direct etherification of glycols with sorbitol or by the reaction of chlorhydrins with sorbitol under strongly alkaline conditions, but preferably are prepared by the direct addition of a 1,2-alkylene oxide to sorbitol in the virtually dry state. Small proportions of water, up to about 5%, may be present in the sorbitol without interfering markedly with the course of the reaction. The product so made will thus contain minor amounts of unreacted sorbitol, alkylene glycol and more highly oxyalkylated derivatives of sorbitol, but the major product is the mono-sorbitol ether of an alkylene oxide and the reaction mixture may be employed as such without purification.

In preparing the ethers of the present invention dry sorbitol, or sorbitol containing a small amount of water is charged into an autoclave preheated to a temperature of from 85° to 90° C., together with a catalyst for the reaction. Air is displaced from the autoclave and the charge is heated with agitation to reaction temperature. Alkylene oxide is then added in increments adjusted in size to prevent the pressure in the autoclave from exceeding 60 pounds per square inch (gauge). When one molar proportion of the oxide has been added, heating and agitation are continued until the reaction is complete as indicated by a decrease of the pressure to a constant value. Depending on the choice of catalyst, oxide, and reaction temperature this may require from 6 to 36 hours. The reaction will proceed at temperatures as low as 100° C. but to attain practical rates of production it is necessary to operate at temperatures above 125° C. and preferred temperatures are 140° C. to 150° C. It is recommended that the temperature not exceed 175° C.

The condensation is catalyzed by both alkaline and acid catalysts. Among catalysts for the reaction may be named sodium methylate, sodium hydroxide, trisodium phosphate, disodium hydrogen phosphate, sodium dihydrogen phosphate, phosphoric acid, boron trifluoride, sodium acetate, mixtures of sodium acetate and acetic acid, acetic acid and the like. The preferred catalyst is sodium dihydrogen phosphate. The catalysts are effective in concentrations of from 0.25 to 2% on the total charge weight of reactants. Preferably about 0.5% is employed.

Specific conditons for preparing ethers in accordance with the invention are described in the following examples.

EXAMPLE 1

A vertical, stirred autoclave of 2 gallons capacity was preheated to about 100° C. and charged with 3220 grams of a sorbitol solution concentrated to a water content of 2.13%, also preheated to 80° to 90° C. and 20 grams of sodium methylate catalyst. The autoclave was freed of oxygen by flushing with nitrogen under 10 pounds pressure and venting. It was then closed, agitation started and the charge heated to 140° C. Ethylene oxide was pumped in until the pressure built up to 60 pounds per square inch (gauge). Introduction of ethylene oxide was then interrupted until enough of it had been consumed by reaction to decrease the pressure to 40 pounds. Repeated increments were added, in quantity and frequency to maintain the pressure at between 40 and 60 pounds, until a total of 820 grams had been added. This represents an excess of 5% over one molar proportion of sorbitol syrup taken. The reaction mass was maintained at 140° C. until the pressure dropped to a substantially constant value. A total time of 15 hours was required for addition and reaction of ethylene oxide. The reaction mass was cooled to 100° C., discharged from the autoclave and filtered. The product was a light colored syrup of very high viscosity containing 1.45% water and having a hydroxyl value of 1475 (dry basis). It was miscible with water in all proportions and showed no tendency to crystallize at any concentration.

Additional preparations were made following the procedure of Example 1 with the variations indicated in the following table:

*Table 1*

| Example No. | 2 | 3 | 4 | 5 | 6 |
|---|---|---|---|---|---|
| Percent Water in sorbitol | 2.14 | 1.72 | 1.9 | 1.4 | 1.9. |
| Wt. sorbitol, grams | 3,220 | 3,220 | 3,220 | 3,030 | 3,030. |
| Catalyst | $Na_3PO_4$ | $H_3PO_4$* | $NaH_2PO_4$ | $NaH_2PO_4$ | $BF_3$**. |
| Am't. catalyst | 20 g. | 5.85 ml. | 20 g. | 20 g. | 4 g. |
| Alkylene oxide | Ethylene | Ethylene | Ethylene | Propylene | Propylene. |
| Wt. alk. oxide, grams | 820 | 820 | 820 | 1,010 | 1,010. |
| Reaction temp., ° C. | 140 | 140 | 140 | 140 | 130. |
| Reaction time, hrs | 12.5 | 8 | 11 | 14 | 9. |
| Water content of reaction product, percent | 1.3 | 4.4 | .82 | 0.4 | 1.22. |
| Hydroxyl value (dry basis) | 1,487 | 1,340 | 1,410 | 1,385 | 1,378. |

*85% solution of $H_3PO_4$.
**$BF_3$—ether complex (48% active).

All of the products were viscous, hygroscopic syrupy liquids. It is to be noted that the strongly acid catalyst of Example 3 promoted anhydrization of the sorbitol residue which is reflected in a somewhat lower hydroxyl number and higher water content as discharged from the autoclave. For many purposes this anhydrization is not objectionable although it is in general better to avoid it and strong mineral acid catalysts are not preferred.

*Example 7*

This example illustrates the condensation of a sorbitol syrup containing about 2% water with ethylene oxide on a somewhat larger scale, and in a circulating autoclave. 314 lbs. of sorbitol syrup containing 2% water was heated to 85° C. and introduced along with 885 g. of $NaH_2PO_4$ hydrate into a pressure reactor equipped to circulate the charge through heat exchanging coils outside the reactor proper. The system was freed from air by flushing with nitrogen at 10 lbs. pressure and venting. Circulation was started and the charge brought to a temperature of 145° C. Ethylene oxide was pumped into the reaction chamber in small increments maintaining the pressure below 55 pounds per square inch. Over the course of 11 hours 79 pounds of ethylene oxide were introduced, after which circulation was continued at 145° C. until the pressure leveled off at 3 pounds. This required an additional hour. Pressure was released and the autoclave discharged. The product was butted to 5% water and decolorized and deodorized by adding 1% of activated carbon and spraying the slurry into a chamber where a vacuum of 15 inches was maintained, recirculating the charge for 15 minutes at 110° C. The vacuum was released and circulation continued for an additional 45 minutes, the charge cooled to 100° C. and filtered. The resulting product was a light-colored syrup containing 5% water, having a viscosity at 25° C. of approximately 75,000 cp. and a hydroxyl value of 1498 (dry basis). It is miscible with water in all proportions and shows no tendency to crystallize on long storage or on drying out.

*Example 8*

In the autoclave described in Example 7, and following the same procedure as described therein, 97 pounds of propylene oxide were condensed with 294 pounds of sorbitol containing 2.13% water. 885 grams of $NaH_2PO_4 \cdot H_2O$ was employed as catalyst and the reaction time was 13 hours. The final product (at 5% water) had a viscosity at 25° C. of 137,000 cp. and a hydroxyl value (dry basis) of 1415.

The products of the invention find use in many industrial applications. As humectants and plasticizers for flexible glues and glue compositions they exhibit all of the advantages of sorbitol without having the tendency, shown by sorbitol, to crystallize on the surface of the composition when the latter is exposed to atmospheres of low humidity. Flexible glues employing the novel humectants of the invention are advantageously employed in book-binding, in sealing tapes, and as the binder in granular cork compositions for gaskets, bottle caps and the like. Other compositions based on glue or gelatin which may advantageously be plasticized with the products of the invention include soft gelatin capsules, gelatin foil and films, hectograph compositions and printers rollers. In such compositions, the plasticizer may comprise the novel products of the invention together with conventional polyhydric alcohol softeners, particularly glycerol, the lower glycols and the like.

The novel humectants of the invention find many uses in the textile and related arts. They may be incorporated in textile finishes to stabilize the moisture content of the fiber-finish system and produce products of good hand and drape. For plasticizers and conditioning agents in textile sizes, particularly gelatin warp sizes, starch sizes and synthetic sizes such as those based on polyvinyl alcohol and other water dispersible resins, the sorbitol mono ethers of the invention are particularly well adapted.

As conditioning agents in textile printing pastes and vat dye pastes the products of the invention are especially useful. Sorbitol is admirably suited to this application in every respect to except for its tendency to crystallize when subjected to dehydrating conditions. Pastes formulated with the ethers of the present invention, even though evaporated to very low moisture contents, as by being exposed in a thin film on heated rollers during temporary shut down of the printing machine, remain soft and print off completely. It is thus unnecessary to scrape or chip dried flakes from the engraved roller with the attendant disk of damage to the printing surface.

The novel humectants of the invention may be employed alone, or in combination with other polyhydric materials as softeners for regenerated cellulose films, for soft paper products, and for parchmentized paper. Their permanently liquid nature and non-volatility make for permanence of the softening action.

Other uses of these products will readily suggest themselves to those skilled in the arts. In cosmetics and pharmaceuticals, they preserve the softness and acceptability of pastes and creams. They are well suited as moisture holding agents in tobacco and tobacco products. Inasmuch as the sorbitol ethers of 1,2-alkylene glycols containing no more than 3 carbon atoms contain reactive hydroxyl groups they may serve as intermediates for the production of other chemical compounds such as esters, acetals, ketals, ethers, etc.

The novel products of the invention have been fully described and methods for their preparation presented in detail. The examples presented were illustrative only and are not to be construed as limiting the invention.

What is claimed is:

1. As a humectant composition the condensation product obtained by reacting sorbitol containing up to 50% by weight of water with one molar proportion of a 1,2-alkylene oxide containing no more than 3 carbon atoms, in the temperature range of 100° to 175° C., at a superatmospheric pressure, and in the presence of a catalyst selected from the group consisting of hydroxides, alcoholates, and weak acid salts of alkali metals.

2. A composition as in claim 1 wherein the alkylene oxide is propylene oxide.

3. A composition as in claim 1 wherein the alkylene oxide is ethylene oxide.

References Cited in the file of this patent

UNITED STATES PATENTS 2,380,185  Marple et al.  ----------  July 10, 1945